United States Patent
Kim et al.

(10) Patent No.: US 12,482,235 B2
(45) Date of Patent: Nov. 25, 2025

(54) SYNTHETIC INFRARED IMAGE GENERATION FOR MACHINE LEARNING OF GAZE ESTIMATION

(71) Applicant: NVIDIA Corporation, Santa Clara, CA (US)

(72) Inventors: Joohwan Kim, San Jose, CA (US); Michael Stengel, Cupertino, CA (US); Zander Majercik, San Francisco, CA (US); Shalini De Mello, San Francisco, CA (US); Samuli Laine, Uusimaa (FI); Morgan McGuire, Williamstown, MA (US); David Luebke, Charlottesville, VA (US)

(73) Assignee: NVIDIA CORPORATION, Santa Clara, CA (US)

( * ) Notice: Subject to any disclaimer, the term of this patent is extended or adjusted under 35 U.S.C. 154(b) by 308 days.

(21) Appl. No.: 17/734,441

(22) Filed: May 2, 2022

(65) Prior Publication Data

US 2022/0284621 A1    Sep. 8, 2022

Related U.S. Application Data

(63) Continuation of application No. 16/355,481, filed on Mar. 15, 2019, now Pat. No. 11,321,865.

(51) Int. Cl.
G06F 3/01    (2006.01)
G06F 7/57    (2006.01)
(Continued)

(52) U.S. Cl.
CPC ............ *G06V 10/774* (2022.01); *G06F 3/013* (2013.01); *G06F 7/57* (2013.01); *G06N 3/045* (2023.01);
(Continued)

(58) Field of Classification Search
CPC ...... G06V 10/774; G06V 40/18; G06V 40/19; G06F 3/013; G06F 7/57; G06F 18/214;
(Continued)

(56) References Cited

U.S. PATENT DOCUMENTS

| 6,028,608 A | 2/2000 | Jenkins |
| 10,039,445 B1 * | 8/2018 | Torch ........................ A61B 5/18 |

(Continued)

FOREIGN PATENT DOCUMENTS

| CN | 106548600 A | 3/2017 |
| CN | 108334832 A | 7/2018 |
| CN | 109271914 A | 1/2019 |

OTHER PUBLICATIONS

Marcus Wallenberg: "A Single-Camera Gaze Tracker using Controlled Infrared Illumination"; 2009; Institutionen for systemteknik, Department of Electrical Engineering; pp. 1-83. (Year: 2009).*
(Continued)

*Primary Examiner* — Siamak Harandi
(74) *Attorney, Agent, or Firm* — Davis Wright Tremaine LLP

(57) ABSTRACT

One embodiment of a method includes calculating one or more activation values of one or more neural networks trained to infer eye gaze information based, at least in part, on eye position of one or more images of one or more faces indicated by an infrared light reflection from the one or more images.

25 Claims, 8 Drawing Sheets

(51) Int. Cl.
  G06N 3/045      (2023.01)
  G06T 7/70       (2017.01)
  G06V 10/774     (2022.01)
  G06V 40/18      (2022.01)
  G06V 40/19      (2022.01)

(52) U.S. Cl.
  CPC ............... *G06T 7/70* (2017.01); *G06V 40/18* (2022.01); *G06V 40/19* (2022.01); *G06T 2207/10048* (2013.01); *G06T 2207/20081* (2013.01); *G06T 2207/20084* (2013.01)

(58) Field of Classification Search
  CPC .......... G06N 3/045; G06N 20/00; G06T 7/70; G06T 2207/10048; G06T 2207/20081; G06T 2207/20084; G06T 11/00; G06T 11/001
  See application file for complete search history.

(56) References Cited

U.S. PATENT DOCUMENTS

| | | | |
|---|---|---|---|
| 2015/0278576 A1* | 10/2015 | Horesh | A61B 3/14 382/103 |
| 2016/0007849 A1 | 1/2016 | Krueger | |
| 2017/0132769 A1* | 5/2017 | Barron | G06T 3/4076 |
| 2019/0012540 A1* | 1/2019 | Trail | H04N 23/11 |
| 2019/0073820 A1 | 3/2019 | Barron | |
| 2019/0205667 A1 | 7/2019 | Avidan et al. | |
| 2019/0266701 A1 | 8/2019 | Isikdogan et al. | |
| 2019/0303723 A1* | 10/2019 | Linden | G06T 7/70 |

OTHER PUBLICATIONS

Joshua M. Susskind, Geoffrey E. Hinton, Javier R. Movellan and Adam K. Anderson: "Generating Facial Expressions with Deep Belief Nets", 2008, Affective Computing, Focus on Emotion Expression, Synthesis and Recognition, pp. 421-440 (Year: 2008).*

Kubler et al. "Rendering refraction and reflection of eyeglasses for synthetic eye tracker images"; Nov. 24, 2015; Computer Science>Computer Vision and Pattern Recognition, 4 pages. (Year: 2015).*

Angelopoulou, "The Reflectance Spectrum of Human Skin," Technical Report MS-CIS-99-29, University of Pennsylvania, 1999, 16 pages.

Baluja et al., "Non-intrusive Gaze Tracking using Artificial Neural Networks," Advances in Neural Information Processing Systems, 1994, 8 pages.

Bridgeman et al., "The Role of Microsaccades in High Acuity Observational Tasks," Vision Research, 1980.

Chetlur et al., "cuDNN: Efficient Primitives for Deep Learning," Dec. 18, 2014, retrived Dec. 30, 2020 from https://arxiv.org/pdf/1410.0759.pdf, 9 pages.

Choe et al., "Pupil Size Dynamics During Fixation Impact the Accuracy and Precision of Video-based Gaze Estimation," Vision Research, 2016, 12 Pages.

Dumoulin et al., "A Learned Representation for Artistic Style," International Conference on Learning Representations, Sep. 9, 2017, 26 pages.

Extended European Search Report mailed Jul. 28, 2020, European Patent Application No. 20160923.7, 9 pages.

Feit et al., "Toward Everyday Gaze Input: Accuracy and Precision of Eye Tracking and Implications for Design," Proceedings of the 2017 CHI Conference on Human Factors in Computing Systems, May 6-11, 2017, 13 pages.

IEEE, "IEEE Standard 754-2008 (Revision of IEEE Standard 754-1985): IEEE Standard for Floating-Point Arithmetic," Aug. 29, 2008, 70 pages.

Naqvi et al., "Deep Learning-Based Gaze Detection System for Automobile Drivers Using a NIR Camera Sensor," Feb. 3, 2018, retrieved Oct. 26, 2020, from https://www.mdpi.com/1424-8220/18/2/456/htm, 34 pages.

Sugano et al., "Learning-by-Synthesis for Appearance-Based 30 Gaze Estimation", IEEE Conference on Computer Vision and Pattern Recognition, 2014, pp. 1821-1828.

Sun et al., "Towards Virtual Reality Infinite Walking: Dynamic Saccadic Redirection", ACM Trans Graph, vol. 37, No. 4. Article 67, Aug. 2018, pp. 67:1-67:13.

Swirski et al, "A fully-automatic, temporal approach to single camera, glint-free 30 eye model fitting", URL: http://www.cl.cam_ac_uk/research/rainbow/projects/eyemodelfit/, Proceedings of ECEM, 2013, pp. 1-10.

Swirski et al, "Rendering synthetic ground truth images for eye tracker evaluation", URL: http://www_cl.cam_ac_uk/esearch/rainbow/projects/eyerender/, Proceedings of ETRA, Mar. 26-28, 2014, pp. 219-222.

Tew, A.I., "Simulation Results for an Innovative Point-of-Regard Sensor Using Neural Networks", Neural Computing S. Applications, vol. 5, 1997, pp. 230-237.

Tonsen et al., "Labelled Pupils in the Wild: A dataset for studying pupil detection in unconstrained environments", Proceedings of the Ninth Biennial ACM Symposium on Eye Tracking Research & Applications, Mar. 14-17, 2016, pp. 39-142.

Tonsen et al., "InvisibleEye: Mobile Eye Tracking Using Multiple Low-Resolution Cameras and Learning-Based Gaze Estimation", Proceedings of the ACM Interactive Mobile Wearable Ubiquitous Technologies, vol. 1, No. 3, Article 106, Sep. 2017, pp. 106:1-106:21.

Ulyanov et al., "Improved Texture Networks: Maximizing Quality and Diversity in Feed-Forward Stylization and lrexture Synthesis", IEEE Conference on Computer Vision and Pattern Recognition, 2017, pp. 4105-4113.

Walsh, Glyn, "The effect of mydriasis on the pupillary centration of the human eye", Ophthal Physiol Opt, vol. 8, Apr. 1988, pp. 178-182.

Wildenmann et al., "Variations of pupil centration and their effects on video eye tracking", Ophthalmic Physiological Optics, vol. 33, 2013, pp. 634-641.

Wood et al., "Learning an Appearance-Based Gaze Estimator from One Million Synthsised Images", ACM, Charleston, SC-ISBN:978-1-4503-4125-7/16/03, Mar. 14-17, 2016, 8 pages.

Wood et al., "Rendering of Eyes for Eye-Shape Registration and Gaze Estimation", Proc. of the IEEE International Conference on Computer Vision, 2015, 9 pages.

Wyatt, Harry J., "The human pupil and the use of video-based eyetrackers", ScienceDirect, Vision Research, vol. 50, 2010, pp. 1982-1988.

Yang et al., "Pupil Location under Mesopic, Photopic, and Pharmacologically Dilated Conditions", Invest Ophthalmol Vis Sci., vol. 43, No. 7, 2002, pp. 1-13.

Zemblys et al., "Making stand-alone PS-OG technology tolerant to the equipment shifts", Proceedings of the 7th Workshop on Pervasive Eye Tracking and Mobile Eye-Based Interaction, ACM, Jun. 14-17, 2018, 9 pages.

Zhang et al., "Appearance-Based Gaze Estimation in the Wild", 2015, 10 pages.

Zhang et al., "MPIIGaze: Real-World Dataset and Deep Appearance-Based Gaze Estimation", IEEE Transactions on Pattern Analysis and Machine Intelligence, 2017, pp. 1-14.

Zhang et al., "Training Person-Specific Gaze Estimators from User Interactions with Multiple Devices", Proceedings of the CHI Conference on Human Factors in Computing Systems, ACM, Article 624, Apr. 21-26, 2018, 12 pages.

Zhu et al., "Head Mounted Pupil Tracking Using Convolutional Neural Network", 2018, 9 pages.

Zonios et al., "Light scattering spectroscopy of human skin in vivo", Optics Express, vol. 17, No. 3, Feb. 2, 009, pp. 1256-1267.

Florea et al., "Can Your Eyes Tell Me How You Think? A Gaze Directed Estimation of the Mental Activity," 2013, 11 Pages.

Fuhl et al., "CBF: Circular binary features for robust and real-time pupil center detection," Jun. 14, Association for Computing Machinery, 2018, 6 Pages.

Fuhl et al., "ElSe: Ellipse Selection for Robust Pupil Detection in Real-World Environments," Nov. 23, 2015, 9 Pages.

(56) References Cited

OTHER PUBLICATIONS

Fuhl et al., "ExCuSe: Robust Pupil Detection in Real-World Scenarios," International Conference on Computer Analysis of Images and Patterns, Springer, Jan. 2015, 13 Pages.

Fuhl et al., "PupilNet v2.0: Convolutional Neural Networks for CPU based real time Robust Pupil Detection," Oct. 30, 2017, 30 Pages.

Gou et al., "Learning-by-Synthesis for Accurate Eye Detection," 23rd International Conference on Pattern Recognition (ICPR), Dec. 4, 2016, 6 Pages.

Guenter et al., "Foveated 3D Graphics," ACM Transactions on Graphics, Nov. 1, 2012, 10 Pages.

Hawes et al., "The Mircroscopic Anatomy of the Lower Eyelid Retractors," Archives of Ophthalmology, Aug. 1982, 6 Pages.

He et al., "Delving deep into rectifiers: Surpassing human-level performance on imagenet classification," Proceedings of the IEEE International Conference on Computer Vision, (2015).

Huang et al., "ScreenGlint: Practical, In-situ Gaze Estimation on Smartphones," Proceedings of the 2017 CHI Conference on Human Factors in Computing Systems (CHI '17), May 6, 2017, 13 Pages.

Javadi et al., "Set: A Pupil Detection Method Using Sinusoidal Approximation," Frontiers in Neuroengineering, Apr. 2015, 11 Pages.

Jegou et al., "Hamming Embedding and Weak Geometric Consistency for Large Scale Image Search," European Conference on Computer Vision, Springer, 2008, 14 Pages.

Jesorsky et al., "Robust Face Detection Using the Hausdor Distance," Jun. 6, 2001, 6 Pages.

Kar et al., "A Review and Analysis of Eye-Gaze Estimation Systems, Algorithms and Performance Evaluation Methods in Consumer Platforms," Aug. 5, 2017, 25 Pages.

Kassner et al., "Pupil: An Open Source Platform for Pervasive Eye Tracking and Mobile Gaze-based Interaction," Apr. 30, 2014, 10 Pages.

Kaufman et al., "Adler's Physiology of the Eye," Elsevier Health Sciences, 2011, 200 Pages.

Kingma et al. "Adam: A Method for Stochastic Optimization," Dec. 22, 2014, 9 pages.

Konrad et al., "Accommodation-invariant computational near-eye displays," ACM Transactions on Graphics, 2017, 13 Pages.

Konrad et al., "Near-Eye Display Gaze Tracking via Convolutional Neural Networks," 2016, 8 Pages.

Kowler et al., "Miniature Saccades: eye movements that do not count," Vision Research, May 1, 1978, 4 Pages.

Krafka et al., "Eye Tracking for Everyone," IEEE Conference on Computer Vision and Pattern Recognition, 2016, 9 Pages.

Kubler et al., "Rendering Refraction and Reflection of Eyeglasses for Synthetic Eye Tracker Images," Ninth Biennial ACM Symposium on Eye Tracking Research and Applications (ETRA '16), Mar. 14, 2017, 4 Pages.

Kyto et al., "Pinpointing: Precise Head- and Eye-Based Target Selection for Augmented Reality," CHI 2018, Apr. 21, 2018, 14 Pages.

Laine et al., "Production-Level Facial Performance Capture Using Deep Convolutional Neural Networks," Jun. 2, 2017, 10 Pages.

Li et al., "Starburst: A Hybrid Algorithm for Video-Based Eye Tracking Combining Feature-Based and Model-Based Approaches," IEEE Computer Society Conference on Computer Vision and Pattern Recognition (CVRP'05), 2005, 8 Pages.

Liou et al., "Anatomically Accurate, Finite Model Eye for Optical Modeling," Aug. 8, 1997, 12 Pages.

Loschky et al., "Investigating Spatial Vision and Dynamic Attentional Selection Using a Gaze-Contingent Multiresolutional Display," Journal of Experimental Psychology: Applied, 2002, 19 Pages.

Maas et al., "Rectifier Nonlinearities Improve Neural Network Acoustic Models," Proceedings of the 30th International Conference on Machine Learning, 2013, 6 Pages.

Mariakakis et al., "PupilScreen: Using Smartphones to Assess Traumatic Brain Injury," ACM on Interactive, Mobile, Wearable and Ubiquitous Technologies, 2017, 27 Pages.

Mora et al., "Eyediap: A Database for the development and evaluation of gaze estimation algorithms from RGB and RGB-D cameras," Mar. 2014, 5 Pages.

Papoutsaki et al., "The Eye of the Typer: A Benchmark and Analysis of Gaza Behavior During Typing," Proceedings of the 2018 ACM Symposium on Eye Tracking Research and Applications, Jun. 14, 2018, 9 Pages.

Park et al., "Deep Pictorial Gaze Estimation," ECCV 2018, 18 Pages.

Park et al., "Learning to Find Eye Region Landmarks for Remote Gaze Estimation in Unconstrained Settings," May 12, 2018, 10 Pages.

Patney et al., "Towards Foveated Rendering for Gaze-Tracked Virtual Reality," ACM Transactions on Graph 2016, 12 pages.

Santini et al., "CalibMe: Fast and Unsupervised Eye Tracker Calibration for Gaze-Based Persuasive Human-Computer Interaction," CHI Conference on Human Factors in Computing Systems (CHI ' 17), May 6, 2017, 12 Pages.

Sardar et al., "Optical Properties of Ocular Tissues in the Near Infrared Region," Lasers in Medical Science, 2007, 7 Pages.

Simonyan et al., Very Deep Convolutional Networks for Large-Scale Image Recognition, Dec. 23, 2014, 13 pages.

Smith et al., "Determining Driver Visual Attention with One Camera," IEEE Transactions on Intelligent Transportation Systems, vol. 4, No. 4, Dec. 2003, 14 Pages.

Smith et al., "Gaze Locking: Passive Eye Contacr Detection for Human-Object Interacrion," Proceedings of the 26th annual ACM Symposium on User Interface Software and Technology, Oct. 8, 2013, 10 Pages.

Srivastava et al., "Dropout: A Simple Way to Prevent Neural Networks from Overfitting," Journal of Machine Learning Research, 15(56) 2014, 30 pages.

Stengel et al., "An Affordable Solution for Binocular Eye Tracking and Calibration in Head-Mounted Displays," Proceedings of the 23rd ACM International Conference on Multimedia, Oct. 26, 2015, 10 Pages.

Steptoe et al. "Eyelid Kinematics for Virtual Characters," Computer Animation and Virtual Worlds, May 28, 2010, 11 Pages.

Office Action for Chinese Application No. 202010158005.2, mailed Nov. 29, 2024, 22 pages.

Office Action for Chinese Application No. 202010158005.2, mailed Apr. 23, 2025, 18 pages.

Notice of Decision to Grant for Chinese Application No. 202010158005.2, mailed Jul. 4, 2025, 7 pages.

* cited by examiner

SYNTHETIC INFRARED IMAGE GENERATION FOR MACHINE LEARNING OF GAZE ESTIMATION

CROSS-REFERENCE TO RELATED APPLICATIONS

This application is a continuation of U.S. application Ser. No. 16/355,481, filed on Mar. 15, 2019, entitled "SYNTHETIC INFRARED IMAGE GENERATION FOR MACHINE LEARNING OF GAZE ESTIMATION," the subject matter of which is hereby incorporated herein by reference.

BACKGROUND

Machine learning models are commonly trained to generate inferences or predictions related to real-world conditions. For example, a neural network may learn to estimate and/or track the position, orientation, speed, velocity, and/or other physical attributes of objects in an image or collection of images. As a result, training data for the neural network may include real-world data, such as images and/or sensor readings related to the objects. However, collecting real-world data for use in training machine learning models can be tedious, inefficient, and/or difficult to scale.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
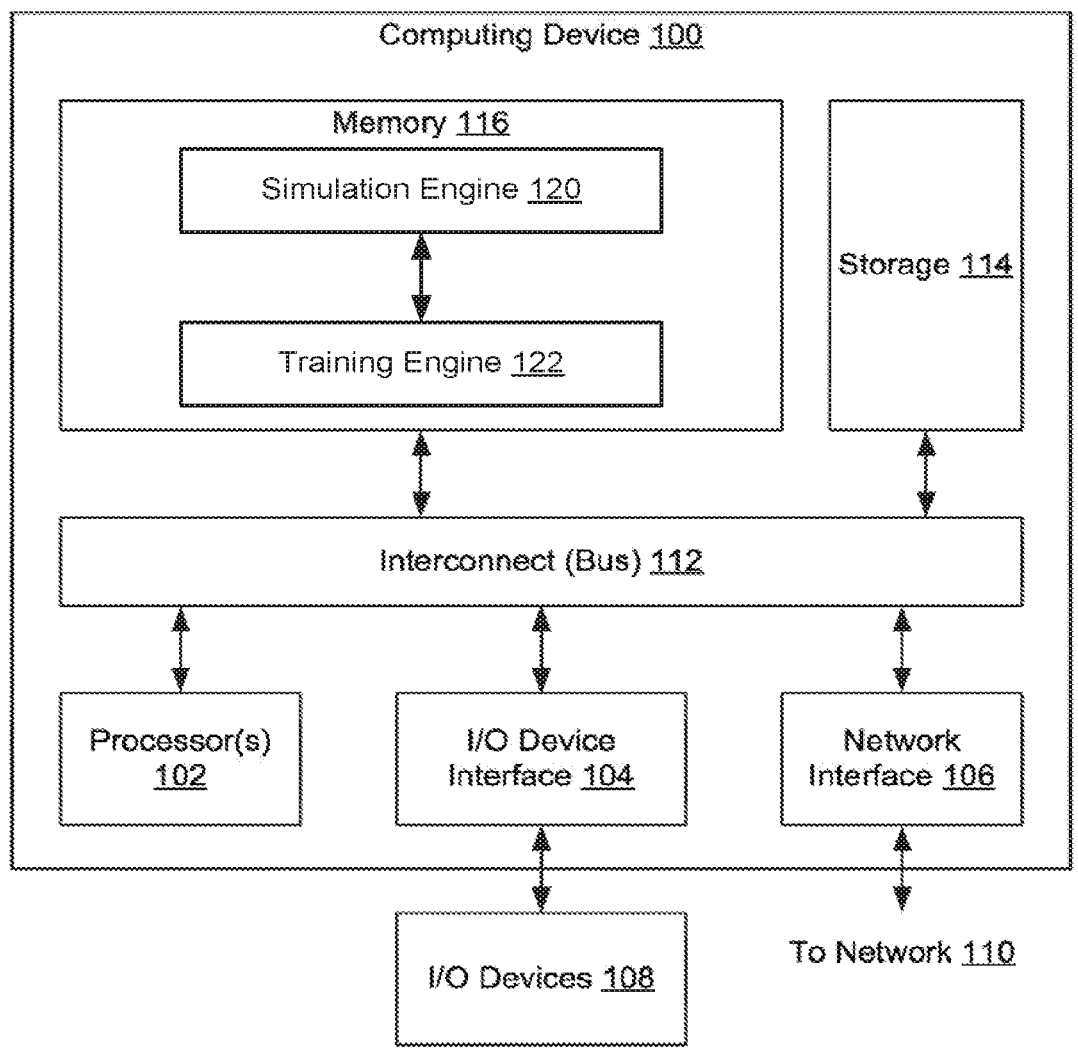
FIG. 1 illustrates a system configured to implement one or more aspects of various embodiments.

FIG. 1 illustrates a computing device 100 configured to implement one or more aspects of various embodiments. In one embodiment, computing device 100 may be a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a simulation engine 120 and training engine 122 that reside in a memory 116. It is noted that the computing device described herein is illustrative and that any other technically feasible configurations fall within the scope of the present disclosure. For example, multiple instances of simulation engine 120 and training engine 122 may execute on a set of nodes in a distributed system to implement the functionality of computing device 100.

In one embodiment, computing device 100 includes, without limitation, an interconnect (bus) 112 that connects one or more processing units 102, an input/output (I/O) device interface 104 coupled to one or more input/output (I/O) devices 108, memory 116, a storage 114, and a network interface 106. Processing unit(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Simulation engine 120 and training engine 122 may be stored in storage 114 and loaded into memory 116 when executed.

In one embodiment, memory 116 includes a random access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processor(s) 102 and application data associated with said software programs, including simulation engine 120 and training engine 122.

In one embodiment, simulation engine 120 includes functionality to generate synthetic images of objects, and training engine 122 includes functionality to train one or more machine learning models using the synthetic images. For example, simulation engine 120 may generate simulated images of eye regions in faces that are illuminated under infrared light, as well as labels representing locations and/or attributes of objects in the eye regions. Training engine 122 may input the simulated images and labels as training data for a neural network and train the neural network to estimate and/or track the lines of sights and/or pupil locations of the eyes in the simulated images.

In some embodiments, synthetic images generated by simulation engine 120 are rendered using geometric representations of faces that accurately model the anatomical features of human eyes and/or rendering settings that simulate infrared light illuminating the eye regions. In turn, machine learning models produced by training engine 122 using images and labels generated by simulation engine 120 may perform gaze estimation and/or other types of inference related to eyes illuminated under infrared light more accurately than machine learning models that are trained using other types of synthetic images of eye regions. Simulation engine 120 and training engine 122 are described in further detail below with respect to FIG. 2.

Synthetic Infrared Image Generation for Machine Learning of Gaze Estimation

Figure 2:
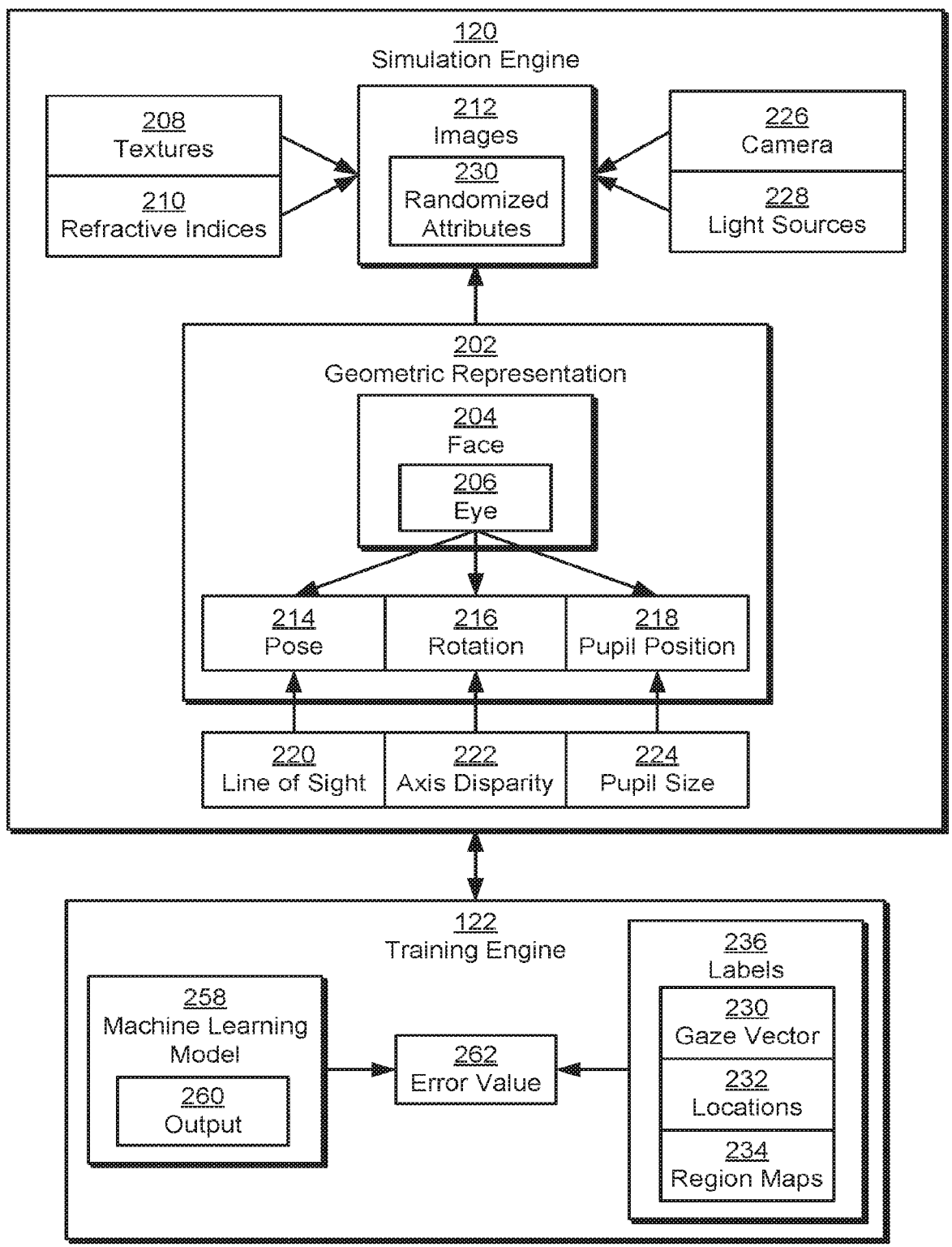
FIG. 2 is a more detailed illustration of the simulation engine and training engine of FIG. 1, according to various embodiments.

FIG. 2 is a more detailed illustration of simulation engine 120 and training engine 122 of FIG. 1, according to various embodiments. In the embodiment shown, simulation engine 122 renders a number of images 212 based on a geometric representation 202 of a face 204, one or more textures 208, one or more refractive indices 210, a camera 226, and/or one or more light sources 228. For example, simulation engine 122 may use a ray-tracing technique to generate synthetic images 212 of a scene containing an eye 206 in face 204 based on a position and orientation of camera 226 in the scene and/or the number and locations of light sources 228 in the scene.

In one or more embodiments, simulation engine 120 utilizes a number of modifications to geometric representation 202, textures 208, refractive indices 210, and/or other components of a rendering pipeline to generate photorealistic and/or accurate images of face 204 and/or eye 206 that simulate real-world conditions under which images of faces and/or eyes are captured. For example, simulation engine 120 may render images 212 that simulate capturing of eye regions in human faces under conditions that match those of near-eye cameras in virtual reality and/or augmented reality headsets. Such conditions may include, but are not limited to: illumination of the eye regions using infrared light wavelengths that cannot be detected by humans; placement of cameras in locations and/or configurations that allow capture of the eye regions within the headsets; and/or the presence of blur, noise, varying intensities, varying contrast, varying exposure, camera slip, and/or camera miscalibration across images.

In one embodiment, simulation engine 120 adjusts eye 206 and/or face 204 in geometric representation 202 to model anatomical features of human eyes. Such adjustments include, but are not limited to, a change in pose 214 of eye 206 based on a selected line of sight 220 for eye 206, a rotation 216 of eye 206 to account for axis disparity 222 between a pupillary axis of eye 206 and line of sight 220, and/or a change in pupil position 218 in eye 206 to reflect shifting of the pupil in eye 206 during constriction of the pupil.

For example, simulation engine 120 may include a geometric model of a human face 204 in geometric representation 202. The geometric model may be generated using a three-dimensional (3D) scan of a real human face with manual retouching, or the geometric model may be produced by simulation engine 120 and/or another component based on features or characteristics of real human faces. Simulation engine 120 may rescale face 204 to accommodate an average-sized (e.g., 24-mm diameter, 7.8 mm radius of curvature at corneal apex, 10 mm radius at the sclera boundary) human eye 206 and insert the average-sized human eye 206 into face 204 within geometric representation 202.

Continuing with the above example, simulation engine 120 may displace face 204 with respect to camera 226 by a small, random offset to model the slippage of a head-mounted camera under real-world conditions. Simulation engine 120 may also determine line of sight 220 from a center of eye 206 to a randomly selected point of regard (e.g., on a fixed screen at a certain distance from face 204) and set pose 214 (i.e., the position and orientation) of eye 206 to reflect line of sight 220. Simulation engine 120 may additionally perform rotation 216 of eye 206 in a temporal direction (i.e., toward the side of the head) by approximately 5 degrees to model the anatomical axis disparity 222 between line of sight 220 and a pupillary axis (i.e., a line perpendicular to the cornea that intersects the center of the pupil) in eye 206.

Continuing with the above example, simulation engine 120 may randomly select an eyelid position in face 204, ranging from fully open to approximately two-thirds closed. For the selected eyelid position, simulation engine 120 may cover approximately four times the surface area of eye 204 with the top eyelid than with the bottom eyelid and animate the skin of the eyelid in synchrony with pose 214 and/or rotation 216 of eye 206 to simulate physically correct eye appearance during a blink.

Continuing with the above example, simulation engine 120 may select pupil size 224 from a useful range of 2 mm to 8 mm and adjust pupil position 218 to model a nasal-superior (i.e., toward the forehead and above the nose) shift of the pupil under constriction due to illumination. For a dilated 8-mm pupil in dim light, simulation engine 120 may adjust pupil position 218 by about 0.1 mm in the nasal and superior directions. For a 4-mm pupil, simulation engine 120 may adjust pupil position 218 by about 0.2 mm in the nasal position and about 0.1 mm in the superior position. For a constricted 2-mm pupil in bright light, simulation engine 120 may adjust pupil position 218 by about 0.1 mm in the superior position.

In one or more embodiments, simulation engine 120 renders images 212 using rendering settings that match those encountered during near-eye image capture under infrared light. In one embodiment, rendering settings used by simulation engine 120 to render images 212 include skin and iris textures 208 containing patterns and intensities that match the observed properties of the corresponding surfaces under monochromatic infrared imaging. For example, simulation engine 120 may increase the brightness and/or homogeneity of one or more texture files for skin in face 204 and use subsurface scattering to simulate a smoothed appearance of skin under one or more infrared light frequencies (e.g., 950 nm, 950 nm, 950 nm, 1000 nm, etc.). In another example, simulation engine 120 may use textures 208 and/or rendering techniques to render sclera in eye 206 without veins because the veins are not visible under infrared light. In a third example, simulation engine 120 may change the reflectance of iris textures 208 to produce a reduced variation in iris color that is encountered under infrared light. In a fourth example, simulation engine 120 may randomly rotate one or more iris textures 208 around the center of the pupil in eye 206 to generate additional variations in the appearance of eye 206 within image 212.

In one embodiment, rendering settings used by simulation engine 120 to render images 212 include refractive indices 210 that match those encountered during illumination of face 204 and/or eye 206 in infrared light. For example, simulation engine 120 may model air with a unit refractive index and the cornea of eye 206 with a refractive index of 1.38 to produce, in images 212, a highly reflective corneal surface on which glints (i.e., reflections of light sources 228 on the cornea) appear.

In one embodiment, rendering settings used by simulation engine 120 to render images 212 include randomized attributes 230 that simulate real-world conditions under which images of human faces may be captured. For example, simulation engine 120 may independently apply random amounts of exposure, noise, blur, intensity modulation, and/or contrast modulation to the iris, sclera, and/or skin regions of face 204 in each image. In another example, simulation engine 120 may randomize skin tone, iris tone, skin texture, and/or iris texture in images 212. In a third example, simulation engine 120 may randomize reflections in front of eye 206 in images 212 to simulate reflection artifacts caused by eyewear and/or an arbitrary semi-transparent layer between an image capture device and a face in a real-world setting.

In one or more embodiments, simulation engine 120 generates labels 236 associated with objects in images 212. For example, simulation engine 120 may output labels 236 as metadata that is stored with or separately from the corresponding images 212. Training engine 122 and/or another component may use labels 236 and images 212 to train and/or assess the performance of a machine learning model 258 and/or technique that performs gaze tracking and/or gaze estimation for human eyes.

In one embodiment, labels 236 include a gaze vector 230 that defines line of sight 220 of eye 206 within each image. For example, gaze vector 230 may be represented as a two-dimensional (2D) point of regard on a fixed screen at a certain distance from face 204 that is intersected by line of sight 220. In another example, gaze vector 230 may include a 3D point that intersected by line of sight 220. In a third example, gaze vector 230 may include a horizontal and vertical gaze angle from a constant reference eye 206 position.

In one embodiment, labels 236 include locations 232 of objects in images 212. For example, labels 236 may include 3D locations of face 204 and/or eye 206 with respect to a reference coordinate system. In another example, labels 236 may include a 2D location of the pupil in eye 206.

In one embodiment, simulation engine 120 may include, in labels 236, region maps 234 that associate individual pixels in images 212 with semantic labels. For example, region maps 234 may include regions of pixels in images 212 that are assigned to labels such as "pupil," "iris," "sclera," "skin," and "glint."

In one embodiment, simulation engine 120 uses region maps 234 to specify pixel locations of anatomical features in images 212 independently of occlusion by eyelids. For example, simulation engine 120 may generate, for each image, one region map that identifies skin, pupil, iris, sclera, and glint(s) in the image. Simulation engine 120 may additional generate, for each image, another region map that locates the pupil, iris, sclera, and/or glint(s) in the image with the skin removed.

In one or more embodiments, training engine 122 uses images 212 and labels 236 produced by simulation engine 120 to train a machine learning model 258 to predict and/or estimate one or more attributes associated with face 204, eye 206, and/or other objects in images 212. For example, training engine 122 may input one or more images 212 into a convolutional neural network and obtain corresponding output 260 from the convolutional neural network that represents a predicted line of sight 220, pupil position 218, and/or other characteristics associated with eye 206 and/or face 204 in the image(s). Training engine 122 may use a loss function for the convolutional neural network to calculate an error value 262 from output 260 and one or more labels 236 for the corresponding image(s). Training engine 122 may also use gradient descent and/or forward and backward propagation to update weights of the convolutional neural network over a series of training iterations, thereby reducing error value 262 over time.

In some embodiments, error value 262 includes a loss term that represents an activation of machine learning model 258 on portions of images 212 that do not contain eye 206. Continuing with the above example, training engine 122 may use region maps 234 to identify skin regions of face 204 in images 212. Training engine 122 may calculate the loss term as the gradient of output 260 of the convolutional neural network with respect to inputs pertaining to the skin regions. Because weights in the convolutional neural network are updated over time to reduce error value 262, the convolutional neural network may learn to ignore the skin region during estimation of line of sight 220, pupil position 218, and/or other attributes of eye 206.

Figure 3:
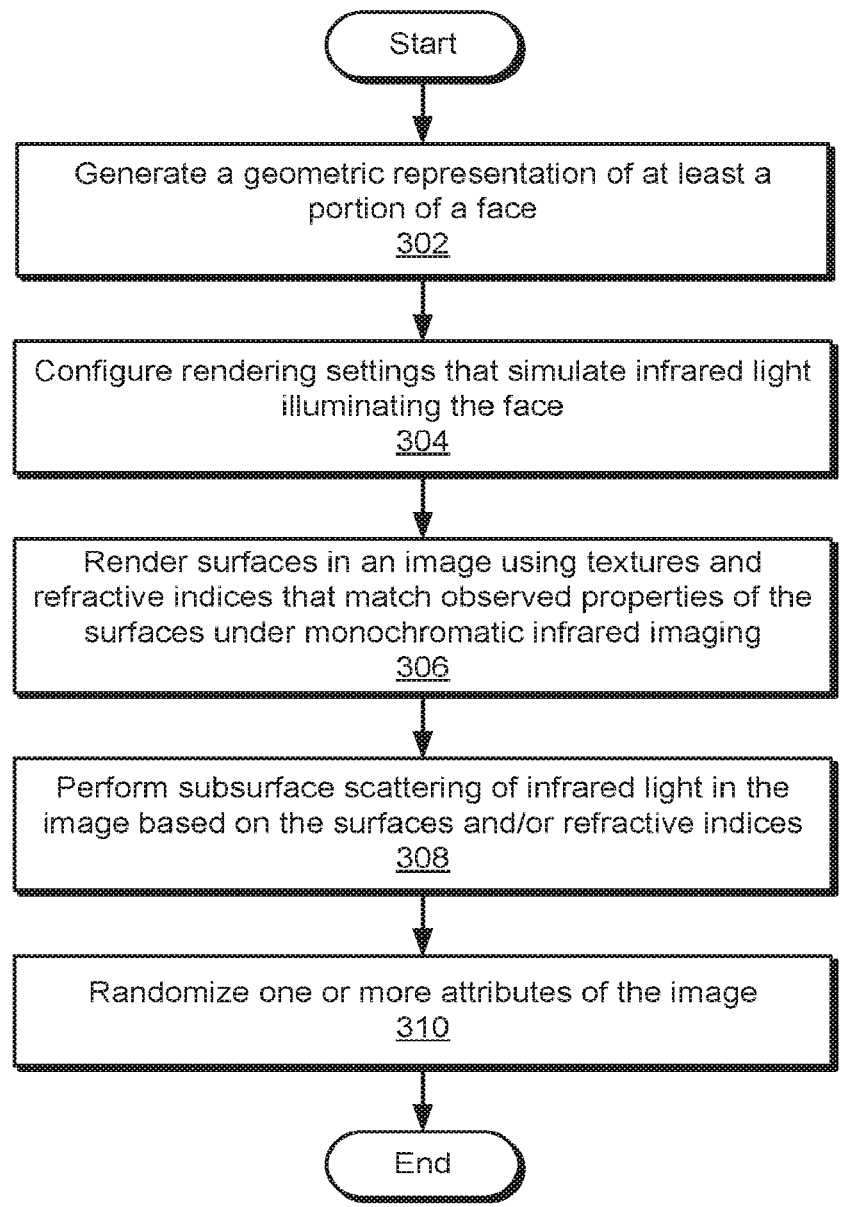
FIG. 3 is a flow diagram of method steps for generating an image for use in training a machine learning model, according to various embodiments.

FIG. 3 is a flow diagram of method steps for generating an image for use in training a machine learning model, according to various embodiments. Although the method steps are described in conjunction with the systems of FIGS. 1 and 2, persons skilled in the art will understand that any system configured to perform the method steps in any order falls within the scope of the present disclosure.

As shown, simulation engine 120 generates 302 a geometric representation of at least a portion of a face. For example, simulation engine 120 may generate the geometric representation using a geometric model of a human face that is scaled to accommodate an average-sized human eye. Within the geometric model, simulation engine 120 may pose the eye in the face based on a line of sight from a center of the eye to a randomly selected point of regard, rotate the eye in a temporal direction to model a disparity between the line of sight and a pupillary axis of the eye, and/or position a pupil in the eye to model a constriction shift of the pupil.

Next, simulation engine 120 configures 304 rendering settings that simulate infrared light illuminating the face and subsequently renders an image of the face according to the rendering settings. In particular, simulation engine 120 renders 306 surfaces in the image using textures and refractive indices that match observed properties of the surfaces under monochromatic infrared imaging. For example, simulation engine 120 may load and/or generate skin and iris textures with increased brightness and/or homogeneity to simulate illumination of the skin and iris of the face under one or more infrared wavelengths. In another example, simulation engine 120 may set refractive indices of the air and materials in the face to produce glints in the cornea of the eye.

Simulation engine 120 also performs 308 subsurface scattering of infrared light in the image based on the surfaces and/or refractive indices. For example, simulation engine 120 may perform subsurface scattering of the infrared light with respect to the skin to generate a smoothed appearance of the skin in the image.

Simulation engine 120 additionally randomizes 310 one or more attributes of the image. For example, simulation engine 120 may randomize blur, intensity, contrast, exposure, sensor noise, skin tone, iris tone, skin texture, and/or reflection in the image. In another example, simulation engine 120 may randomize the distance from the face to a camera used to render the image.

Figure 4:
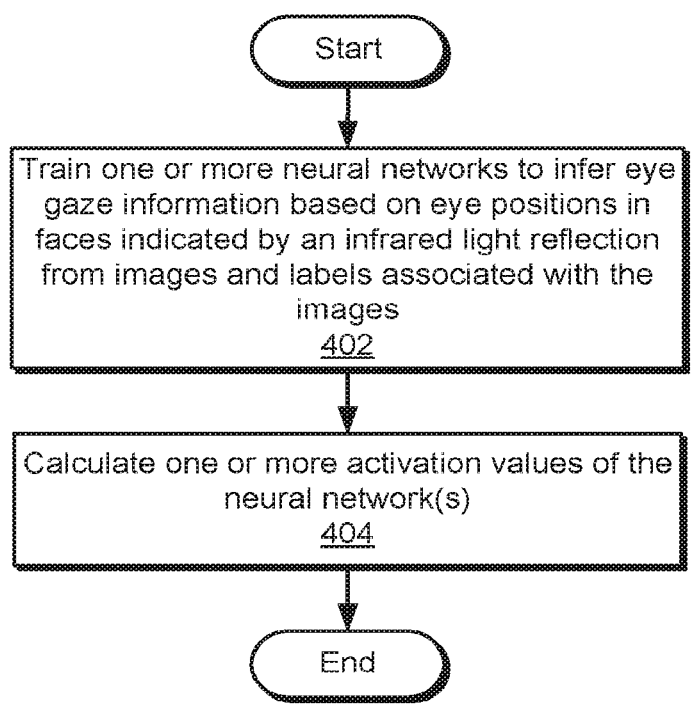
FIG. 4 is a flow diagram of method steps for configuring use of a neural network, according to various embodiments.

FIG. 4 is a flow diagram of method steps for configuring use of a neural network, according to various embodiments. Although the method steps are described in conjunction with the systems of FIGS. 1 and 2, persons skilled in the art will understand that any system configured to perform the method steps in any order falls within the scope of the present disclosure.

As shown, training engine 122 trains 402 one or more neural networks to infer eye gaze information based on eye positions in faces indicated by an infrared light reflection from images and labels associated with the images. For example, training engine 122 may obtain multiple synthetic images of faces illuminated by infrared light, which are generated by simulation engine 120 using the method steps described above with respect to FIG. 3. Training engine 122 also uses labels produced by simulation engine 120 for the images to reduce the error associated with predictions of line of sight, pupil location, and/or other eye gaze information outputted by the neural network(s) from the images.

The labels may include region maps of pixels in an image to semantic labels for a pupil, iris, sclera, skin, and/or corneal reflection in a face. The labels may also, or instead, include a gaze vector defining the line of sight, an eye location, and/or the pupil location. During training of the neural network(s), training engine 122 may use the labels to update weights in the neural network(s) based on a loss term representing an activation of the neural network(s) on a skin region in the images, thereby training the neural network(s) to ignore the skin region during inference of the eye gaze information from the images.

Next, training engine 122 calculates 404 one or more activation values of the neural network(s). For example, training engine 122 may generate the activation values based on additional images inputted into the neural network(s). The activation values may include the line of sight, pupil location, and/or other eye gaze information related to faces illuminated by infrared light in the additional images.

Example Hardware Architecture

Figure 5:
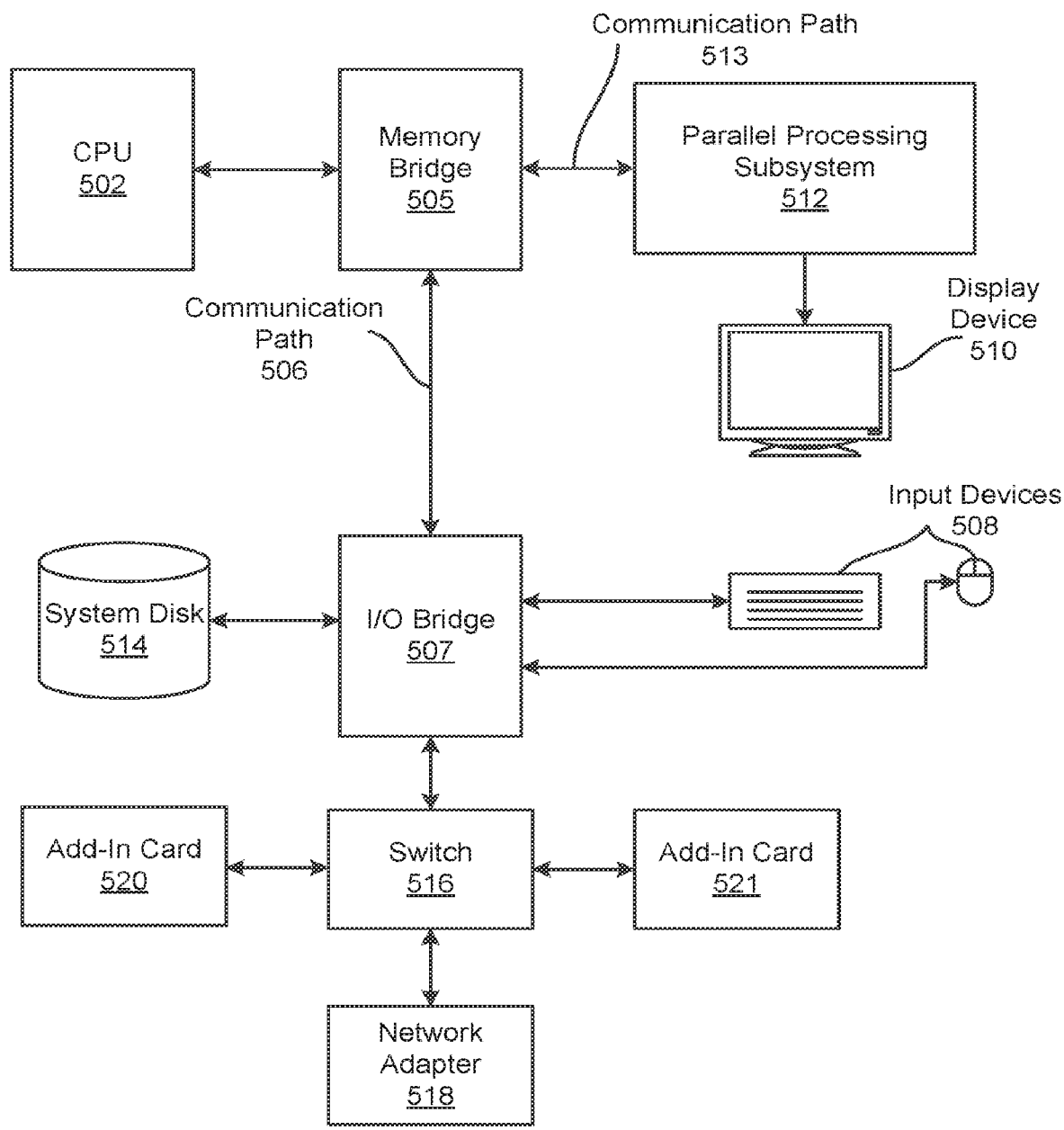
FIG. 5 is a block diagram illustrating a computer system configured to implement one or more aspects of various embodiments.

FIG. 5 is a block diagram illustrating a computer system 500 configured to implement one or more aspects of various embodiments. In some embodiments, computer system 500 is a server machine operating in a data center or a cloud computing environment that provides scalable computing resources as a service over a network. In some embodiments, computer system 500 implements the functionality of computing device 100 of FIG. 1.

In various embodiments, computer system 500 includes, without limitation, a central processing unit (CPU) 502 and a system memory 504 coupled to a parallel processing subsystem 512 via a memory bridge 505 and a communication path 513. Memory bridge 505 is further coupled to an I/O (input/output) bridge 507 via a communication path 506, and I/O bridge 507 is, in turn, coupled to a switch 516.

In one embodiment, I/O bridge 507 is configured to receive user input information from optional input devices 508, such as a keyboard or a mouse, and forward the input information to CPU 502 for processing via communication path 506 and memory bridge 505. In some embodiments, computer system 500 may be a server machine in a cloud computing environment. In such embodiments, computer system 500 may not have input devices 508. Instead, computer system 500 may receive equivalent input information by receiving commands in the form of messages transmitted over a network and received via the network adapter 518. In one embodiment, switch 516 is configured to provide connections between I/O bridge 507 and other components of the computer system 500, such as a network adapter 518 and various add-in cards 520 and 521.

In one embodiment, I/O bridge 507 is coupled to a system disk 514 that may be configured to store content and applications and data for use by CPU 502 and parallel processing subsystem 512. In one embodiment, system disk 514 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 507 as well.

In various embodiments, memory bridge 505 may be a Northbridge chip, and I/O bridge 507 may be a Southbridge chip. In addition, communication paths 506 and 513, as well as other communication paths within computer system 500, may be implemented using any technically suitable protocols, including, without limitation, AGP (Accelerated Graphics Port), HyperTransport, or any other bus or point-to-point communication protocol known in the art.

In some embodiments, parallel processing subsystem 512 comprises a graphics subsystem that delivers pixels to an optional display device 510 that may be any conventional cathode ray tube, liquid crystal display, light-emitting diode display, or the like. In such embodiments, the parallel processing subsystem 512 incorporates circuitry optimized for graphics and video processing, including, for example, video output circuitry. As described in greater detail below in conjunction with FIGS. 6 and 7, such circuitry may be incorporated across one or more parallel processing units (PPUs), also referred to herein as parallel processors, included within parallel processing subsystem 512.

In other embodiments, the parallel processing subsystem 512 incorporates circuitry optimized for general purpose and/or compute processing. Again, such circuitry may be incorporated across one or more PPUs included within parallel processing subsystem 512 that are configured to perform such general purpose and/or compute operations. In yet other embodiments, the one or more PPUs included within parallel processing subsystem 512 may be configured to perform graphics processing, general purpose processing, and compute processing operations. System memory 504 includes at least one device driver configured to manage the processing operations of the one or more PPUs within parallel processing subsystem 512.

In various embodiments, parallel processing subsystem 512 may be integrated with one or more of the other elements of FIG. 5 to form a single system. For example, parallel processing subsystem 512 may be integrated with CPU 502 and other connection circuitry on a single chip to form a system on chip (SoC).

In one embodiment, CPU 502 is the master processor of computer system 500, controlling and coordinating operations of other system components. In one embodiment, CPU 502 issues commands that control the operation of PPUs. In some embodiments, communication path 513 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 502, and the number of parallel processing subsystems 512, may be modified as desired. For example, in some embodiments, system memory 504 could be connected to CPU 502 directly rather than through memory bridge 505, and other devices would communicate with system memory 504 via memory bridge 505 and CPU 502. In other embodiments, parallel processing subsystem 512 may be connected to I/O bridge 507 or directly to CPU 502, rather than to memory bridge 505. In still other embodiments, I/O bridge 507 and memory bridge 505 may be integrated into a single chip instead of existing as one or more discrete devices. Lastly, in certain embodiments, one or more components shown in FIG. 5 may not be present. For example, switch 516 could be eliminated, and network adapter 518 and add-in cards 520, 521 would connect directly to I/O bridge 507.

Figure 6:
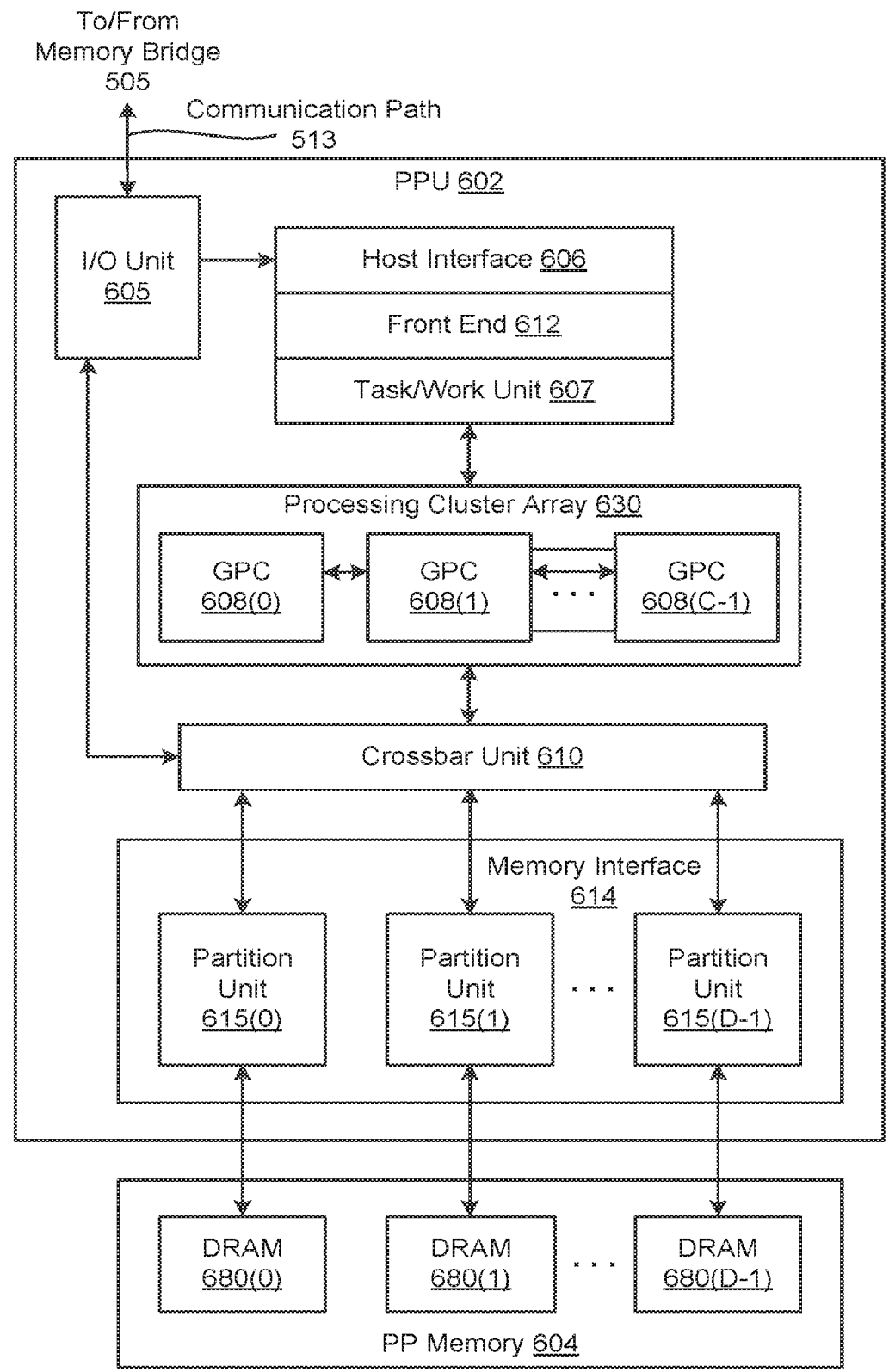
FIG. 6 is a block diagram of a parallel processing unit (PPU) included in the parallel processing subsystem of FIG. 5, according to various embodiments.

FIG. 6 is a block diagram of a parallel processing unit (PPU) 602 included in the parallel processing subsystem 512 of FIG. 5, according to various embodiments. Although FIG. 6 depicts one PPU 602, as indicated above, parallel processing subsystem 512 may include any number of PPUs 602. As shown, PPU 602 is coupled to a local parallel processing (PP) memory 604. PPU 602 and PP memory 604 may be implemented using one or more integrated circuit devices, such as programmable processors, application specific integrated circuits (ASICs), or memory devices, or in any other technically feasible fashion.

In some embodiments, PPU 602 comprises a graphics processing unit (GPU) that may be configured to implement a graphics rendering pipeline to perform various operations related to generating pixel data based on graphics data supplied by CPU 502 and/or system memory 504. When processing graphics data, PP memory 604 can be used as graphics memory that stores one or more conventional frame buffers and, if needed, one or more other render targets as well. Among other things, PP memory 604 may be used to store and update pixel data and deliver final pixel data or display frames to an optional display device 510 for display. In some embodiments, PPU 602 also may be configured for general-purpose processing and compute operations. In some embodiments, computer system 500 may be a server machine in a cloud computing environment. In such embodiments, computer system 500 may not have a display device 510. Instead, computer system 500 may generate equivalent output information by transmitting commands in the form of messages over a network via the network adapter 518.

In some embodiments, CPU 502 is the master processor of computer system 500, controlling and coordinating operations of other system components. In one embodiment, CPU 502 issues commands that control the operation of PPU 602. In some embodiments, CPU 502 writes a stream of commands for PPU 602 to a data structure (not explicitly shown in either FIG. 5 or FIG. 6) that may be located in system memory 504, PP memory 604, or another storage location accessible to both CPU 502 and PPU 602. A pointer to the data structure is written to a command queue, also referred to herein as a pushbuffer, to initiate processing of the stream of commands in the data structure. In one embodiment, the PPU 602 reads command streams from the command queue and then executes commands asynchronously relative to the operation of CPU 502. In embodiments where multiple pushbuffers are generated, execution priorities may be specified for each pushbuffer by an application program via device driver to control scheduling of the different pushbuffers.

In one embodiment, PPU 602 includes an I/O (input/output) unit 605 that communicates with the rest of computer system 500 via the communication path 513 and memory bridge 505. In one embodiment, I/O unit 605 generates packets (or other signals) for transmission on communication path 513 and also receives all incoming packets (or other signals) from communication path 513, directing the incoming packets to appropriate components of PPU 602. For example, commands related to processing tasks may be directed to a host interface 606, while commands related to memory operations (e.g., reading from or writing to PP memory 604) may be directed to a crossbar unit 610. In one embodiment, host interface 606 reads each command queue and transmits the command stream stored in the command queue to a front end 612.

As mentioned above in conjunction with FIG. 5, the connection of PPU 602 to the rest of computer system 500 may be varied. In some embodiments, parallel processing subsystem 512, which includes at least one PPU 602, is implemented as an add-in card that can be inserted into an expansion slot of computer system 500. In other embodiments, PPU 602 can be integrated on a single chip with a bus bridge, such as memory bridge 505 or I/O bridge 507. Again, in still other embodiments, some or all of the elements of PPU 602 may be included along with CPU 502 in a single integrated circuit or system of chip (SoC).

In one embodiment, front end 612 transmits processing tasks received from host interface 606 to a work distribution unit (not shown) within task/work unit 607. In one embodiment, the work distribution unit receives pointers to processing tasks that are encoded as task metadata (TMD) and stored in memory. The pointers to TMDs are included in a command stream that is stored as a command queue and received by the front end unit 612 from the host interface 606. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 607 receives tasks from the front end 612 and ensures that GPCs 608 are configured to a valid state before the processing task specified by each one of the TMDs is initiated. A priority may be specified for each TMD that is used to schedule the execution of the processing task. Processing tasks also may be received from the processing cluster array 630. Optionally, the TMD may include a parameter that controls whether the TMD is added to the head or the tail of a list of processing tasks (or to a list of pointers to the processing tasks), thereby providing another level of control over execution priority.

In one embodiment, PPU 602 implements a highly parallel processing architecture based on a processing cluster array 630 that includes a set of C general processing clusters (GPCs) 608, where C≥1. Each GPC 608 is capable of executing a large number (e.g., hundreds or thousands) of threads concurrently, where each thread is an instance of a program. In various applications, different GPCs 608 may be allocated for processing different types of programs or for performing different types of computations. The allocation of GPCs 608 may vary depending on the workload arising for each type of program or computation.

In one embodiment, memory interface 614 includes a set of D of partition units 615, where D≥1. Each partition unit 615 is coupled to one or more dynamic random access memories (DRAMs) 620 residing within PPM memory 604. In some embodiments, the number of partition units 615 equals the number of DRAMs 620, and each partition unit 615 is coupled to a different DRAM 620. In other embodiments, the number of partition units 615 may be different than the number of DRAMs 620. Persons of ordinary skill in the art will appreciate that a DRAM 620 may be replaced with any other technically suitable storage device. In operation, various render targets, such as texture maps and frame buffers, may be stored across DRAMs 620, allowing partition units 615 to write portions of each render target in parallel to efficiently use the available bandwidth of PP memory 604.

In one embodiment, a given GPC 608 may process data to be written to any of the DRAMs 620 within PP memory 604. In one embodiment, crossbar unit 610 is configured to route the output of each GPC 608 to the input of any partition unit 615 or to any other GPC 608 for further processing. GPCs 608 communicate with memory interface 614 via crossbar unit 610 to read from or write to various DRAMs 620. In some embodiments, crossbar unit 610 has a connection to I/O unit 605, in addition to a connection to PP memory 604 via memory interface 614, thereby enabling the processing cores within the different GPCs 608 to communicate with system memory 504 or other memory not local to PPU 602. In the embodiment of FIG. 6, crossbar unit 610 is directly connected with I/O unit 605. In various embodiments, crossbar unit 610 may use virtual channels to separate traffic streams between the GPCs 608 and partition units 615.

In one embodiment, GPCs 608 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 602 is configured to transfer data from system memory 504 and/or PP memory 604 to one or more on-chip memory units, process the data, and write result data back to system memory 504 and/or PP memory 604. The result data may then be accessed by other system components, including CPU 502, another PPU 602 within parallel processing subsystem 512, or another parallel processing subsystem 512 within computer system 500.

In one embodiment, any number of PPUs 602 may be included in a parallel processing subsystem 512. For example, multiple PPUs 602 may be provided on a single add-in card, or multiple add-in cards may be connected to communication path 513, or one or more of PPUs 602 may be integrated into a bridge chip. PPUs 602 in a multi-PPU system may be identical to or different from one another. For example, different PPUs 602 might have different numbers of processing cores and/or different amounts of PP memory 604. In implementations where multiple PPUs 602 are present, those PPUs may be operated in parallel to process data at a higher throughput than is possible with a single PPU 602. Systems incorporating one or more PPUs 602 may be implemented in a variety of configurations and form factors, including, without limitation, desktops, laptops, handheld personal computers or other handheld devices, servers, workstations, game consoles, embedded systems, and the like.

Figure 7:
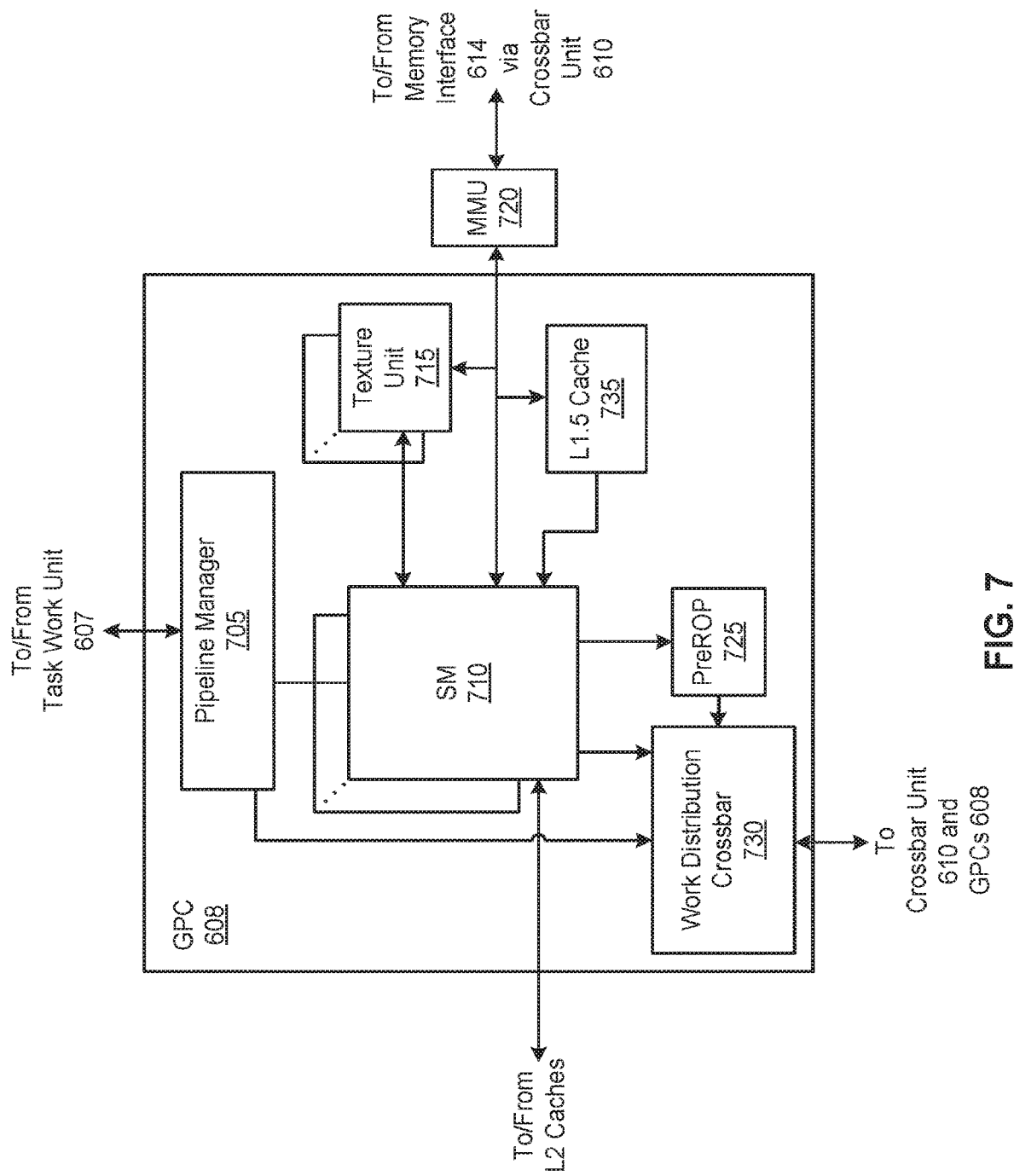
FIG. 7 is a block diagram of a general processing cluster (GPC) included in the parallel processing unit (PPU) of FIG. 6, according to various embodiments.

FIG. 7 is a block diagram of a general processing cluster (GPC) 608 included in the parallel processing unit (PPU) 602 of FIG. 6, according to various embodiments. As shown, the GPC 608 includes, without limitation, a pipeline manager 705, one or more texture units 715, a preROP unit 725, a work distribution crossbar 730, and an L1.5 cache 735.

In one embodiment, GPC 608 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 608. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 608 is controlled via a pipeline manager 705 that distributes processing tasks received from a work distribution unit (not shown) within task/work unit 607 to one or more streaming multiprocessors (SMs) 710. Pipeline manager 705 may also be configured to control a work distribution crossbar 730 by specifying destinations for processed data output by SMs 710.

In various embodiments, GPC 608 includes a set of M of SMs 710, where M≥1. Also, each SM 710 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 710 may be provided. In various embodiments, the functional execution units may be configured to support a variety of different operations including integer and floating point arithmetic (e.g., addition and multiplication), comparison operations, Boolean operations (AND, OR, 5OR), bit-shifting, and computation of various algebraic functions (e.g., planar interpolation and trigonometric, exponential, and logarithmic functions, etc.). Advantageously, the same functional execution unit can be configured to perform different operations.

In various embodiments, each SM 710 includes multiple processing cores. In one embodiment, the SM 710 includes a large number (e.g., 128, etc.) of distinct processing cores. Each core may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores include 64 single-precision (32-bit) floating point cores, 64 integer cores, 32 double-precision (64-bit) floating point cores, and 8 tensor cores.

In one embodiment, tensor cores configured to perform matrix operations, and, in one embodiment, one or more tensor cores are included in the cores. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use tensor cores from a CUDA-C++ program. At the CUDA level, the warp-level interface assumes 16×16 size matrices spanning all 32 threads of the warp.

Neural networks rely heavily on matrix math operations, and complex multi-layered networks require tremendous amounts of floating-point performance and bandwidth for both efficiency and speed. In various embodiments, with thousands of processing cores, optimized for matrix math operations, and delivering tens to hundreds of TFLOPS of performance, the SMs 710 provide a computing platform capable of delivering performance required for deep neural network-based artificial intelligence and machine learning applications.

In various embodiments, each SM 710 may also comprise multiple special function units (SFUs) that perform special functions (e.g., attribute evaluation, reciprocal square root, and the like). In one embodiment, the SFUs may include a tree traversal unit configured to traverse a hierarchical tree data structure. In one embodiment, the SFUs may include texture unit configured to perform texture map filtering operations. In one embodiment, the texture units are configured to load texture maps (e.g., a 2D array of texels) from memory and sample the texture maps to produce sampled texture values for use in shader programs executed by the SM. In various embodiments, each SM 710 also comprises multiple load/store units (LSUs) that implement load and store operations between the shared memory/L1 cache and register files internal to the SM 710.

In one embodiment, each SM 710 is configured to process one or more thread groups. As used herein, a "thread group" or "warp" refers to a group of threads concurrently executing the same program on different input data, with one thread of the group being assigned to a different execution unit within an SM 710. A thread group may include fewer threads than the number of execution units within the SM 710, in which case some of the execution may be idle during cycles when that thread group is being processed. A thread group may also include more threads than the number of execution units within the SM 710, in which case processing may occur over consecutive clock cycles. Since each SM 710 can support up to G thread groups concurrently, it follows that up to G*M thread groups can be executing in GPC 608 at any given time.

Additionally, in one embodiment, a plurality of related thread groups may be active (in different phases of execution) at the same time within an SM 710. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 710, and m is the number of thread groups simultaneously active within the SM 710. In some embodiments, a single SM 710 may simultaneously support multiple CTAs, where such CTAs are at the granularity at which work is distributed to the SMs 710.

In one embodiment, each SM 710 contains a level one (L1) cache or uses space in a corresponding L1 cache outside of the SM 710 to support, among other things, load and store operations performed by the execution units. Each SM 710 also has access to level two (L2) caches (not shown) that are shared among all GPCs 608 in PPU 602. The L2 caches may be used to transfer data between threads. Finally, SMs 710 also have access to off-chip "global" memory, which may include PP memory 604 and/or system memory 504. It is to be understood that any memory external to PPU 602 may be used as global memory. Additionally, as shown in FIG. 7, a level one-point-five (L1.5) cache 735 may be included within GPC 608 and configured to receive and hold data requested from memory via memory interface 614 by SM 710. Such data may include, without limitation, instructions, uniform data, and constant data. In embodiments having multiple SMs 710 within GPC 608, the SMs 710 may beneficially share common instructions and data cached in L1.5 cache 735.

In one embodiment, each GPC 608 may have an associated memory management unit (MMU) 720 that is configured to map virtual addresses into physical addresses. In various embodiments, MMU 720 may reside either within GPC 608 or within the memory interface 614. The MMU 720 includes a set of page table entries (PTEs) used to map a virtual address to a physical address of a tile or memory page and optionally a cache line index. The MMU 720 may include address translation lookaside buffers (TLB) or caches that may reside within SMs 710, within one or more L1 caches, or within GPC 608.

In one embodiment, in graphics and compute applications, GPC 608 may be configured such that each SM 710 is coupled to a texture unit 715 for performing texture mapping operations, such as determining texture sample positions, reading texture data, and filtering texture data.

In one embodiment, each SM 710 transmits a processed task to work distribution crossbar 730 in order to provide the processed task to another GPC 608 for further processing or to store the processed task in an L2 cache (not shown), parallel processing memory 604, or system memory 504 via crossbar unit 610. In addition, a pre-raster operations (preROP) unit 725 is configured to receive data from SM 710, direct data to one or more raster operations (ROP) units within partition units 615, perform optimizations for color blending, organize pixel color data, and perform address translations.

It will be appreciated that the architecture described herein is illustrative and that variations and modifications are possible. Among other things, any number of processing units, such as SMs 710, texture units 715, or preROP units 725, may be included within GPC 608. Further, as described above in conjunction with FIG. 6, PPU 602 may include any number of GPCs 608 that are configured to be functionally similar to one another so that execution behavior does not depend on which GPC 608 receives a particular processing task. Further, each GPC 608 operates independently of the other GPCs 608 in PPU 602 to execute tasks for one or more application programs.

Figure 8:
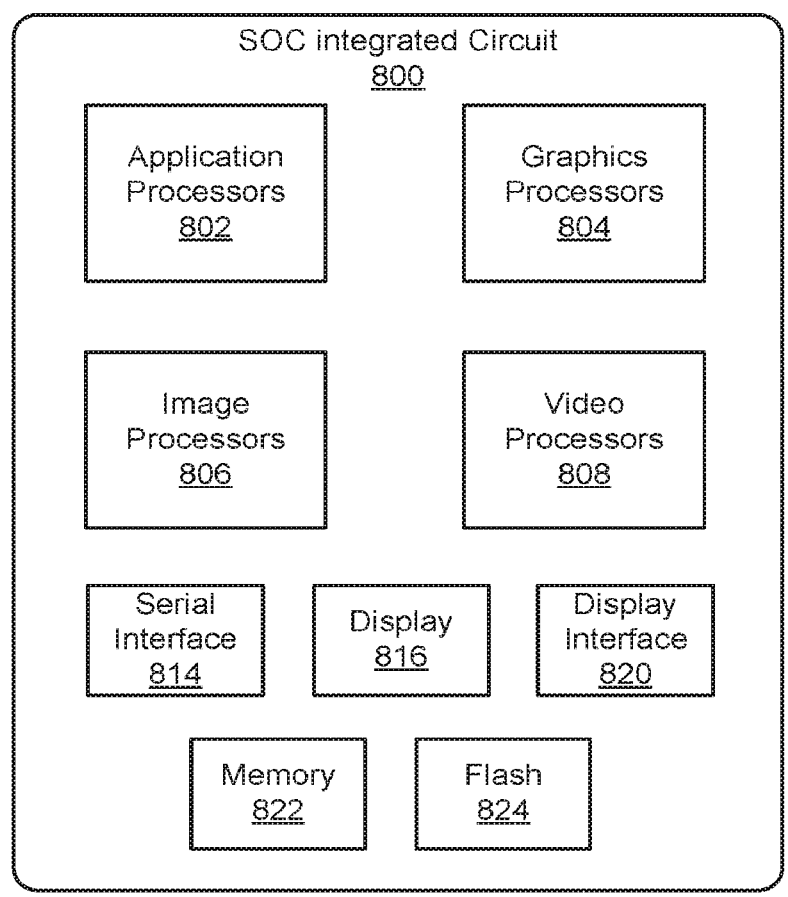
FIG. 8 is a block diagram of an exemplary system on a chip (SoC) integrated circuit, according to various embodiments.

FIG. 8 is a block diagram of an exemplary system on a chip (SoC) integrated circuit 800, according to various embodiments. SoC integrated circuit 800 includes one or more application processors 802 (e.g., CPUs), one or more graphics processors 804 (e.g., GPUs), one or more image processors 806, and/or one or more video processors 808. SoC integrated circuit 800 also includes peripheral or bus components such as a serial interface controller 814 that implements Universal Serial Bus (USB), Universal Asynchronous Receiver/Transmitter (UART), Serial Peripheral Interface (SPI), Secure Digital Input Output (SDIO), inter-IC sound ($I^2S$), and/or Inter-Integrated Circuit ($I^2C$). SoC integrated circuit 800 additionally includes a display device 818 coupled to a display interface 820 such as high-definition multimedia interface (HDMI) and/or a mobile industry processor interface (MIPI). SoC integrated circuit 800 further includes a Flash memory subsystem 824 that provides storage on the integrated circuit, as well as a memory controller 822 that provides a memory interface for access to memory devices.

In one or more embodiments, SoC integrated circuit 800 is implemented using one or more types of integrated circuit components. For example, SoC integrated circuit 800 may include one or more processor cores for application processors 802 and/or graphics processors 804. Additional functionality associated with serial interface controller 814, display device 818, display interface 820, image processors 806, video processors 808, AI acceleration, machine vision, and/or other specialized tasks may be provided by application-specific integrated circuits (ASICs), application-specific standard parts (ASSPs), field-programmable gate arrays (FPGAs), and/or other types of customized components.

In sum, the disclosed techniques perform rendering of synthetic infrared images for use in machine learning of gaze detection. The rendering may be performed using geometric representations of eyes, pupils, and/or other objects in human faces that reflect lines of sight, anatomical axis disparities, and/or pupil constriction shift in the faces. The rendering may also, or instead, be performed using textures, refractive indices, and/or subsurface scattering that simulate infrared illumination of the faces. The rendering may also, or instead, be performed using randomized attributes such as blur, intensity, contrast, a distance of the face to a camera, exposure, sensor noise, skin tone, iris tone, skin texture, and/or reflections.

One technological advantage of the disclosed techniques includes higher accuracy and/or better performance in machine learning models that are trained using the images to perform near-eye gaze estimation, remote gaze tracking, pupil detection, and/or other types of inference. Another technological advantage of the disclosed techniques includes improved interaction between humans and virtual reality systems, augmented reality systems, and/or other human-computer interaction techniques that utilize the output of the machine learning models. Consequently, the disclosed techniques provide technological improvements in the training, execution, and performance of machine learning models, computer systems, applications, and/or techniques for performing gaze tracking, generating simulated images of faces, and/or interacting with humans.

1. In some embodiments, a processor comprises one or more arithmetic logic units (ALUs) to calculate one or more activation values of one or more neural networks trained to infer eye gaze information based, at least in part, on eye position of one or more images of one or more faces indicated by an infrared light reflection from the one or more images.

2. The processor of clause 1, wherein the one or more neural networks are further trained to infer the eye gaze information based at least on labels associated with the one or more images.

3. The processor of clauses 1-2, wherein the labels comprise region maps of pixels in an image to semantic labels.

4. The processor of clauses 1-3, wherein the semantic labels comprise at least one of a pupil, an iris, a sclera, a skin, and a corneal reflection.

5. The processor of clauses 1-4, wherein the labels comprise at least one of a gaze vector, an eye location, and a pupil location.

6. The processor of clauses 1-5, wherein the one or more images are generated by generating a geometric representation of at least a portion of a face; and rendering an image of the geometric representation using rendering settings that simulate infrared light illuminating the face.

7. The processor of clauses 1-6, wherein generating the geometric representation of at least the portion of the face comprises posing an eye in the face based on a line of sight from a center of the eye to a randomly selected point of regard; and rotating the eye in a temporal direction to model a disparity between the line of sight and a pupillary axis of the eye.

8. The processor of clauses 1-7, wherein generating the geometric representation of at least the portion of the face further comprises positioning a pupil in the eye to model a constriction shift of the pupil.

9. The processor of clauses 1-8, wherein rendering the image comprises rendering surfaces in the image using textures that match observed properties of the surfaces under monochromatic infrared imaging.

10. The processor of clauses 1-9, wherein rendering the image comprises rendering surfaces in the one or more images using refractive indices that match observed properties of the surfaces under monochromatic infrared imaging; and performing subsurface scattering of the infrared light in the one or more images based on the refractive indices.

11. In some embodiments, a method comprises generating neural network weight information to configure one or more processors to infer eye gaze information based, at least in part, on eye position of one or more images of one or more faces indicated by an infrared light reflection from the one or more images.

12. The method of clause 11, wherein the one or more images are rendered using one or more randomized image attributes.

13. The method of clauses 11-12, wherein the one or more randomized image attributes comprise at least one of a blur, an intensity, a contrast, a distance of the face to a camera, an exposure, and a sensor noise.

14. The method of clauses 11-13, wherein the one or more randomized image attributes comprise at least one of a skin tone, an iris tone, a skin texture, and a reflection.

15. The method of clauses 11-14, wherein generating the neural network weight information to configure the one or more processors to infer the eye gaze information comprises updating the neural network weight information based on a loss term representing an activation of the neural network on a skin region in the one or more images of the one or more faces.

16. In some embodiments, a machine-readable medium has stored thereon a set of instructions, which if performed by one or more processors, cause the one or more processors to at least train one or more neural networks to infer eye gaze information based, at least in part, on eye position of one or more images of one or more faces indicated by an infrared light reflection from the one or more images.

17. The non-transitory computer readable medium of clause 16, wherein the one or more images are rendered using one or more randomized image attributes.

18. The non-transitory computer readable medium of clauses 16-17, wherein the one or more randomized attributes comprise at least one of a blur, an intensity, a contrast, a distance of a face to a camera, an exposure, a sensor noise, a skin tone, an iris tone, a skin texture, and a reflection.

19. The non-transitory computer readable medium of clauses 16-18, wherein the eye gaze information comprises at least one of a line of sight and a pupil location.

20. The non-transitory computer readable medium of clauses 16-19, wherein the one or more neural networks comprise a convolutional neural network.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more processors, comprising circuitry to:
cause one or more neural networks to be trained to infer eye gaze information based, at least in part, on one or more synthetic images, generated by a simulator, of one or more eyes indicated by an infrared light reflection information from one or more images of one or more eyes.

2. The one or more processors of claim 1, wherein the one or more synthetic images comprises synthetic images of the infrared light reflection from the one or more eyes generated by the one or more neural networks.

3. The one or more processors of claim 1, wherein the one or more synthetic images comprises:
one or more images of eye regions in faces illuminated under infrared light; and
one or more labels corresponding to one or more locations or attributes in the eye regions.

4. The one or more processors of claim 1, wherein the circuitry use one or more geometric representations of the one or more eyes to generate the one or more synthetic images based, at in part, on the infrared light reflection information.

5. The one or more processors of claim 1, wherein the infrared light reflection information comprises one or more light frequencies to be applied to different regions of the one or more eyes.

6. A system, comprising:
one or more processors to cause one or more neural networks to be trained to infer eye gaze information based, at least in part, on one or more synthetic images, generated by a simulator, of one or more eyes indicated by an infrared light reflection information from one or more images of one or more eyes.

7. The system of claim 6, wherein the one or more processors are to adjust the infrared light reflection information of the one or more eyes to generate the one or more synthetic images comprising varying skin textures of one or more faces.

8. The system of claim 6, wherein the one or more processors are to apply random environmental conditions to the one or more eyes of the one or more images with different infrared wavelengths to generate the one or more synthetic images.

9. The system of claim 6, wherein the one or more processors are to apply different infrared light reflection information to different regions of one or more faces to generate the one or more synthetic images.

10. The system of claim 6, wherein the one or more synthetic images comprises one or more labels to be associated with one or more pixels in one or more images with semantic labels.

11. A method, comprising:
causing one or more neural networks to be trained to infer eye gaze information based, at least in part, on one or more synthetic images, generated by a simulator, of one or more eyes indicated by an infrared light reflection information from one or more images of one or more eyes.

12. The method of claim 11, wherein the one or more synthetic images comprises a geometric representation of a portion of a face having the infrared light reflection information to be applied.

13. The method of claim 11, further comprising using a simulation engine to apply different infrared light reflection information to different parts of the one or more eyes to generate the one or more synthetic images, wherein the different parts include a pupil, iris, sclera and cornea of the one or more eyes.

14. The method of claim 11, further comprising obtaining eye regions of a face of a person using a virtual reality headset to generate the one or more synthetic images.

15. The method of claim 11, wherein the one or more synthetic images comprises one or more images of the one or more eyes with one or more glints in the cornea of the one or more eyes.

16. A non-transitory machine readable medium having stored thereon a set of instructions, which if performed by one or more processors, cause the one or more processors to cause one or more neural networks to be trained to infer eye gaze information based, at least in part, on one or more synthetic images, generated by a simulator, of one or more eyes indicated by an infrared light reflection information from one or more images of one or more eyes.

17. The non-transitory machine readable medium of claim 16, wherein the set of instructions which if performed by the one or more processors, cause the one or more processors to generate the one or more synthetic images by applying different infrared wavelengths to the skin and iris of one or more faces comprising the one or more eyes.

18. The non-transitory machine readable medium of claim 16, wherein the set of instructions which if performed by the one or more processors, cause the one or more processors to train the one or more neural networks to infer gaze information based, at least in part, on positions of the one or more eyes in the one or more synthetic images.

19. The non-transitory machine readable medium of claim 16, wherein the set of instructions which if performed by the one or more processors, cause the one or more processors to generate the one or more synthetic images based, at least in part, on a position and orientation of a camera or a number and locations of light sources in a scene.

20. The non-transitory machine readable medium of claim 16, wherein the one or more synthetic images comprises one or more labels associated with one or more pixels from the one or more synthetic images.

21. One or more processors comprising circuitry to:
use one or more neural networks to help control a device using one or more synthetic images comprising infrared light reflection information generated, by a simulator, based, at least in part, on one or more images of one or more eyes of at least a person using the device.

22. The one or more processors of claim 21, wherein the device comprises a virtual reality (VR) or augmented reality (AR) headset.

23. The one or more processors of claim 21, wherein the one or more processors are to cause the one or more synthetic images to be generated based, at least in part, on the infrared light reflection from the one or more images of the one or more eyes.

24. The one or more processors of claim 21, wherein the one or more images comprises geometric representations of a face of the person using the device.

25. The one or more processors of claim 21, wherein the one or more processors are is to illuminate the one or more eyes of the person using different infrared light wavelengths to generate the one or more images.

* * * * *